(12) United States Patent
Shiraishi

(10) Patent No.: US 8,411,321 B2
(45) Date of Patent: Apr. 2, 2013

(54) PRINTING APPARATUS, LAYOUT ADJUSTMENT METHOD, PROGRAM AND RECORDING MEDIUM

(75) Inventor: Atsushi Shiraishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 396 days.

(21) Appl. No.: 12/876,556

(22) Filed: Sep. 7, 2010

(65) Prior Publication Data

US 2011/0058193 A1 Mar. 10, 2011

(30) Foreign Application Priority Data

Sep. 9, 2009 (JP) .................................. 2009-207838
Jul. 2, 2010 (JP) .................................. 2010-151840

(51) Int. Cl.
*G06F 15/00* (2006.01)
*G06F 3/12* (2006.01)
*H04N 1/21* (2006.01)
*H04N 1/04* (2006.01)
*H04N 5/76* (2006.01)
*G03F 3/08* (2006.01)

(52) U.S. Cl. ....... 358/1.9; 358/1.15; 358/1.18; 358/302; 358/474; 358/518; 348/231.5

(58) Field of Classification Search .................. 358/1.9, 358/1.12, 1.14, 1.15, 515, 521, 1.18, 518, 358/302, 474; 348/231.5
See application file for complete search history.

(56) References Cited

U.S. PATENT DOCUMENTS

| | | | | |
|---|---|---|---|---|
| 4,888,648 | A * | 12/1989 | Takeuchi et al. | 386/278 |
| 5,796,428 | A * | 8/1998 | Matsumoto et al. | 348/207.99 |
| 6,222,947 | B1 * | 4/2001 | Koba | 382/284 |
| 8,086,612 | B2 * | 12/2011 | Matsushita et al. | 707/752 |
| 8,254,720 | B2 * | 8/2012 | Matsuzaki | 382/276 |
| 2008/0074441 | A1 * | 3/2008 | Chujo et al. | 345/634 |

FOREIGN PATENT DOCUMENTS

| | | |
|---|---|---|
| JP | 2003-058867 | 2/2003 |
| JP | 2005-094424 | 4/2005 |
| JP | 2006-343977 | 12/2006 |
| JP | 2007-049387 | 2/2007 |

* cited by examiner

*Primary Examiner* — King Poon
*Assistant Examiner* — Ibrahim Siddo

(57) ABSTRACT

Disclosed is a printing apparatus including an image input unit, a first image narrowing unit, and gives a high weight for image data photographed during a time period in which the number of shots is large, a second image narrowing unit, and gives a high weight for image data photographed during a time period in which the number of shots is large, a weight synthesis unit, a layout decision unit, an image data extraction unit, an image assignment unit, an image color determination unit, and an additional information adjustment unit. The first image narrowing unit counts a group of a plurality of image data photographed at a predetermined time under a specific setting as one group including a number of shots, and calculates the number of shots for each predetermined time period based on the shooting date and time of the image data.

19 Claims, 14 Drawing Sheets

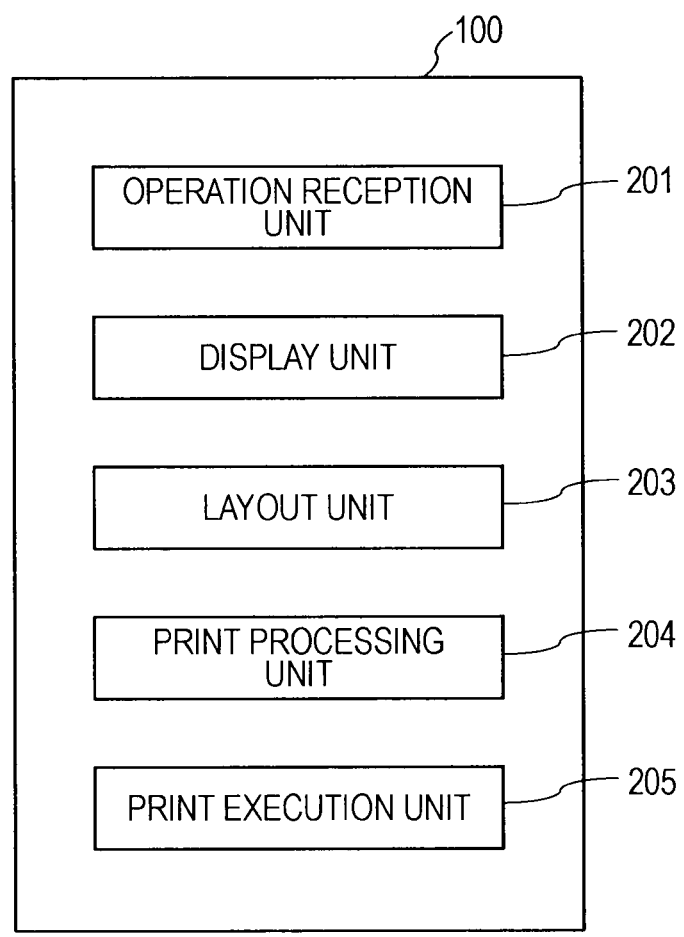

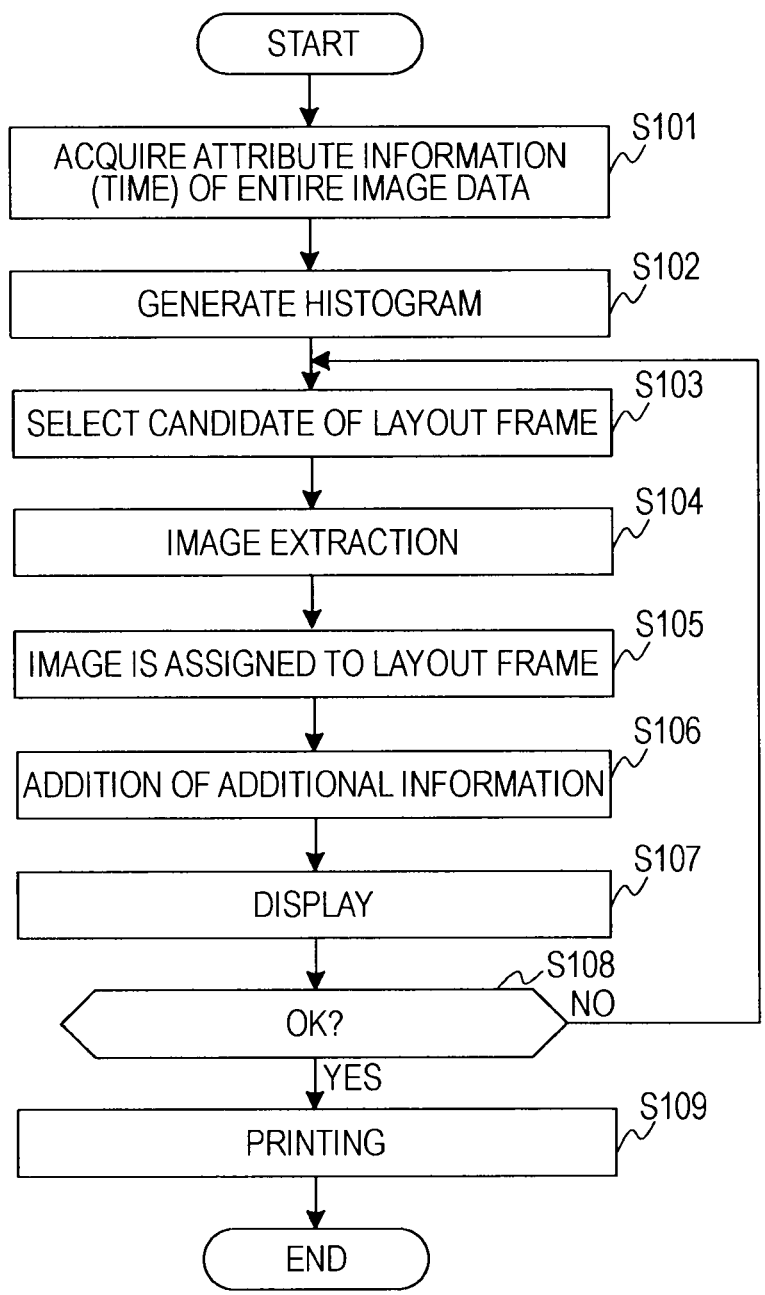

HISTOGRAM

HISTOGRAM

FIG. 5
CANDIDATE IMAGE
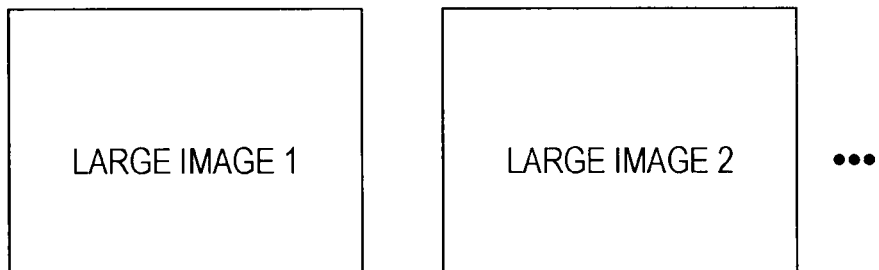
ASSIGNED
CANDIDATE LAYOUT FRAME
LARGEST FRAME
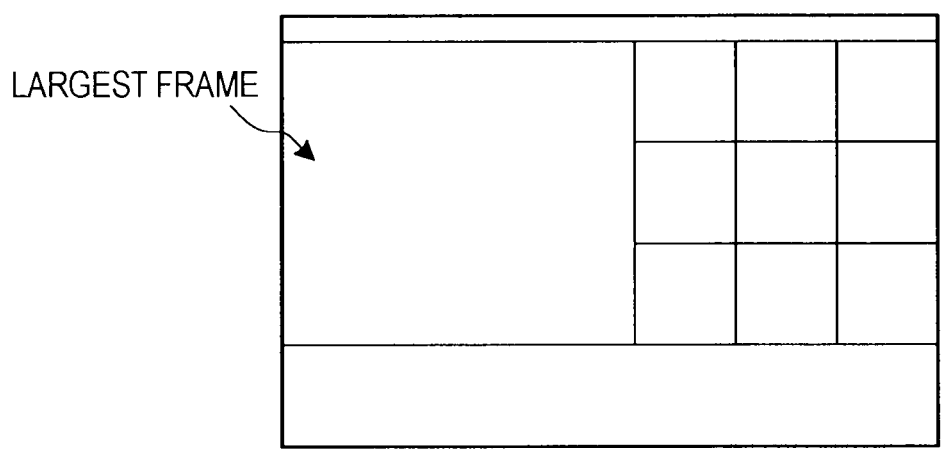

PRINTING APPARATUS, LAYOUT ADJUSTMENT METHOD, PROGRAM AND RECORDING MEDIUM

CROSS-REFERENCE TO RELATED APPLICATION(S)

Japanese Patent Application Nos. 2009-207838, filed Sep. 9, 2009 and 2010-151840, filed Jul. 2, 2010, are hereby incorporated by reference in their entirety.

BACKGROUND

1. Field of Invention

The present invention relates to a printing apparatus, a layout adjustment method, a program and a recording medium.

2. Description of Related Art

Some of printing apparatuses have a function of creating an album (an image) by freely disposing a plurality of image data or editing a character string (hereinafter, referred to as "additional information") of a title and the like (for example, JP-A-2005-94424) through an operation of a user.

Furthermore, recently, since the recording capacity of a digital camera, a USB memory and the like has increased, it is possible to record a large amount of image data such as photographs.

However, it is difficult to select image data to be used for the album and the like from the large amount of image data, or decide the layout of image data. Furthermore, it is also difficult to edit additional information suitable for the selected image data.

SUMMARY OF INVENTION

An advantage of some aspects of the invention is to provide a technology for selecting image data to be used from a large amount of image data and easily creating an album (an image).

According to a first aspect of the invention, there is provided a printing apparatus including: an image input unit that inputs image data; a first image narrowing unit that calculates the number of shots for each predetermined time period based on shooting date and time of image data, and gives a high weight for image data photographed during a time period in which the number of shots is large; a second image narrowing unit that calculates the number of shots for each predetermined time period based on shooting date and time of image data photographed under a specific setting, and gives a high weight for image data photographed during a time period in which the number of shots is large; a weight synthesis unit that synthesizes the weight given by the first image narrowing unit and the weight given by the second image narrowing unit; a layout decision unit that decides a layout of image data to be printed and additional information of the image data; an image data extraction unit that extracts image data in a descending order of weight from the image data input by the image input unit; an image assignment unit that assigns the image data extracted by the image data extraction unit to the layout determined by the layout decision unit; an image color determination unit that determines a color with a highest appearance frequency of the image data assigned to the layout; and an additional information adjustment unit that adjusts a color of the additional information according to the color determined by the image color determination unit, wherein the first image narrowing unit counts a group of a plurality of image data photographed at a predetermined time under a specific setting as one group including a number of shots, and calculates the number of shots for each predetermined time period based on the shooting date and time of the image data.

In the printing apparatus, the group of the plurality of image data photographed at the predetermined time under the specific setting includes a group of image data photographed under at least one setting of continuous shooting and auto-bracketing.

According to a second aspect of the invention, there is provided a printing apparatus including: an image input unit that inputs image data; a first image narrowing unit that calculates the number of shots for each predetermined time period based on shooting date and time of image data, and gives a high weight for image data photographed during a time period in which the number of shots is large; a second image narrowing unit that calculates the number of shots for each predetermined time period based on shooting date and time of image data photographed under a specific setting, and gives a high weight for image data photographed during a time period in which the number of shots is large; a weight synthesis unit that synthesizes the weight given by the first image narrowing unit and the weight given by the second image narrowing unit; a layout decision unit that decides a layout of image data to be printed and additional information of the image data; an image data extraction unit that extracts image data in a descending order of weight from the image data input by the image input unit; an image assignment unit that assigns the image data extracted by the image data extraction unit to the layout determined by the layout decision unit; an image color determination unit that determines a color with a highest appearance frequency of the image data assigned to the layout; an additional information adjustment unit that adjusts a color of the additional information according to the color determined by the image color determination unit; a display unit that displays the image data assigned to the layout and the additional information according to the layout; an operation unit that receives an operation for replacing the displayed image data assigned to the layout with other image data; and an image reassignment unit that replaces the image data assigned to the layout with other image data through a predetermined operation received in the operation unit based on at least one of shooting date and time and weight of the image data input by the image input unit.

In the printing apparatus, the image reassignment unit may replace the image data in a sequence of shooting date and time through a first operation received in the operation unit.

Furthermore, in any one of the printing apparatuses, the image reassignment unit may set one representative image data in a group of image data photographed during a predetermined time period, a group of image data photographed under a specific setting, or a group of a predetermined number of pieces of image data, and replace the image data input by the image input unit with the representative image data in a sequence of shooting date and time through a second operation received in the operation unit.

Furthermore, in any one of the printing apparatuses, the image reassignment unit may replace the image data in a sequence of weight through a third operation received in the operation unit.

Furthermore, in any one of the printing apparatuses, when the image data is replaced by the image reassignment unit, the image color determination unit may determine the color with the highest appearance frequency of the image data reassigned to the layout, and the additional information adjustment unit adjusts the color of the additional information according to the color determined by the image color determination unit.

Furthermore, in any one of the printing apparatuses, the image data may be replaced in each frame included in the layout.

In addition, in any one of the printing apparatuses, the layout decision unit may decide the layout based on the number of shots of image data.

Moreover, in any one of the printing apparatuses, the layout decision unit may decide the layout based on a designation of a user.

According to a third aspect of the invention, there is provided a printing apparatus including: an image input unit that inputs image data; a layout decision unit that decides a layout of image data to be printed; an image data extraction unit that extracts the image data to be printed from the image data input by the image input unit based on shooting date and time of the image data; an image assignment unit that assigns the image data extracted by the image data extraction unit to the layout determined by the layout decision unit; a display unit that displays the image data assigned to the layout according to the layout; an operation unit that receives an operation for replacing the displayed image data assigned to the layout with other image data; and an image reassignment unit that replaces the image data assigned to the layout with other image data through a predetermined operation received in the operation unit based on shooting date and time of the image data input by the image input unit.

According to a fourth aspect of the invention, there is provided a method for adjusting a layout of image data, including: inputting image data; deciding a layout of image data to be printed; extracting the image data to be printed from the image data input by the image input unit based on shooting date and time of the image data; assigning the image data extracted by the image data extraction unit to the layout determined by the layout decision unit; displaying the image data assigned to the layout according to the layout; receiving an operation for replacing the displayed image data assigned to the layout with other image data; and replacing the image data assigned to the layout with other image data through the received predetermined operation based on shooting date and time of the image data input in the inputting of the image data.

According to a fifth aspect of the invention, there is provided a program prompting a computer to execute functions of: inputting image data; deciding a layout of image data to be printed; extracting the image data to be printed from the image data input by the image input unit based on shooting date and time of the image data; assigning the image data extracted by the image data extraction unit to the layout determined by the layout decision unit; displaying the image data assigned to the layout according to the layout; receiving an operation for replacing the displayed image data assigned to the layout with other image data; and replacing the image data assigned to the layout with other image data through the received predetermined operation based on shooting date and time of the image data input in the inputting of the image data.

According to a sixth aspect of the invention, there is provided a printing apparatus including: an image input unit that inputs image data; a layout decision unit that decides a layout of image data to be printed and additional information of the image data; an image data extraction unit that extracts the image data to be printed from the image data input by the image input unit based on shooting date and time of the image data; an image assignment unit that assigns the image data extracted by the image data extraction unit to the layout determined by the layout decision unit; an image color determination unit that determines a color with a highest appearance frequency of the image data assigned to the layout; and an additional information adjustment unit that adjusts a color of the additional information according to the color determined by the image color determination unit.

BRIEF DESCRIPTION OF THE DRAWINGS

The invention will be described with reference to the accompanying drawings, wherein like numbers reference like elements.

FIG. 2 is a diagram showing the functional configuration of a printing apparatus.

FIG. 3 is a flowchart explaining an album creation process in a printing apparatus.

FIG. 5 is a diagram explaining an operation in which image data is assigned to a layout frame.

DESCRIPTION OF THE PREFERRED EMBODIMENTS

Hereinafter, a first embodiment of the present invention will be described with reference to the accompanying drawings.

Figure 1:
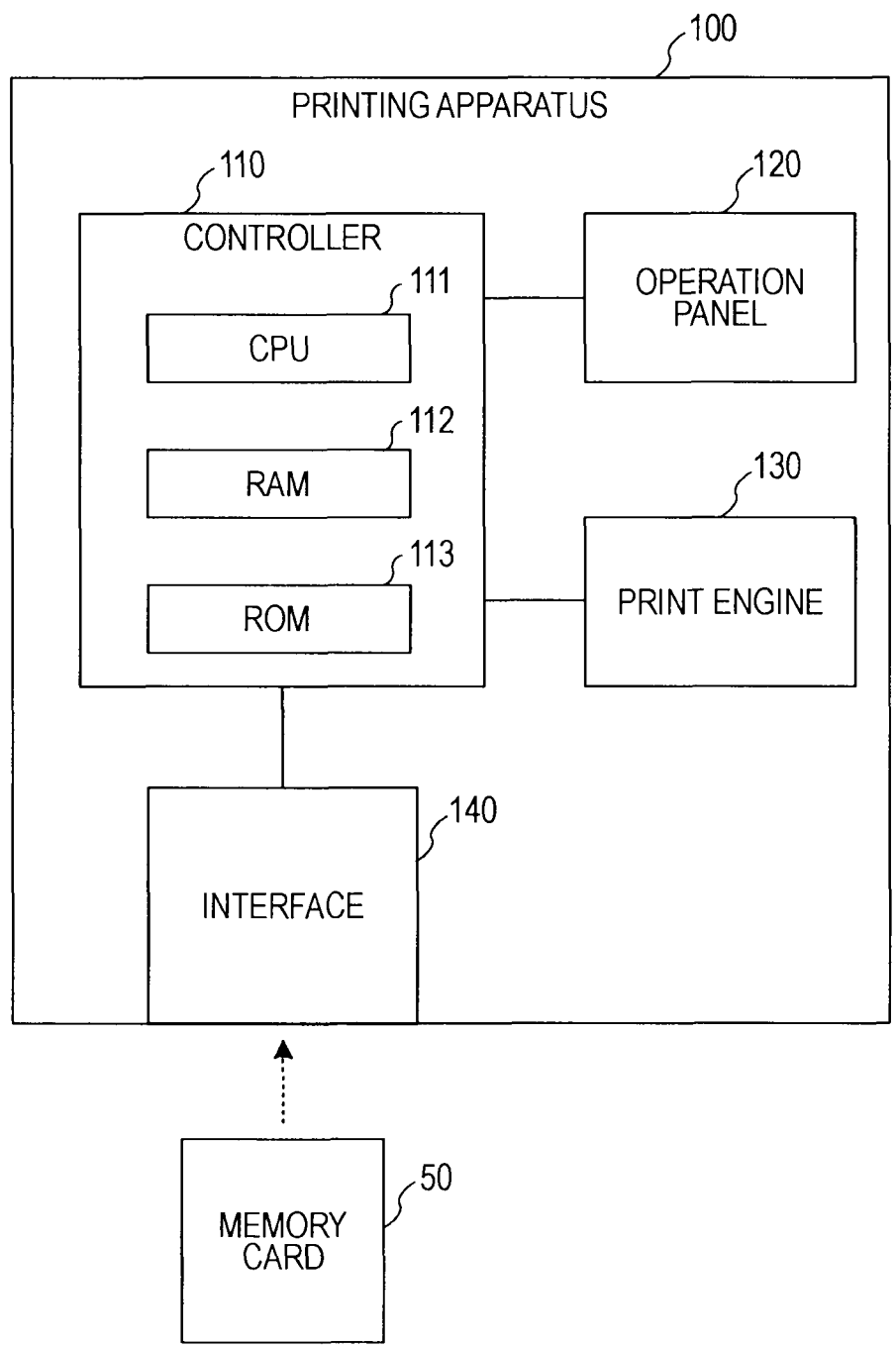
FIG. 1 is a diagram schematically showing the configuration of a printing apparatus in accordance with a first embodiment of the present invention.

FIG. 1 is a diagram schematically showing the configuration of a printing apparatus 100 to which the first embodiment of the present invention is applied.

The printing apparatus 100, for example, includes a printer or a copy machine. As shown in FIG. 1, the printing apparatus 100 includes a controller 110, an operation panel 120, a print engine 130 and an interface 140.

The controller 110 is formed of a chip (SoC) which controls the main functions of the printing apparatus 100 to control the whole of the printing apparatus 100. For example, the controller 110 acquires attribute information (e.g., a shooting date and time) of image data from a memory card 50. Furthermore, the controller 110 decides a layout (a layout frame and a layout template) of image data (used for an album) to be printed and the above-described additional information. Then, the controller 110 extracts the image data to be printed from the memory card 50 based on the shooting date and time of the image data. In addition, the controller 110 assigns the extracted image data to the previously determined layout (the layout frame and the layout template). Then, the controller 110 generates print data based on the layout (the layout frame and the layout template), to which the image data and the additional information have been assigned, and allows the print engine 130 to print the print data, thereby creating the album (image).

In order to realize the above-described processes, as shown in FIG. 1, the controller 110 includes a CPU (Central Processing Unit) 111, a RAM (Random Access Memory) 112, and a ROM (Read Only Memory) 113. In addition, the controller 110 may also be formed of a dedicated ASIC designed for performing the processes.

The CPU 111 executes various programs. Furthermore, the RAM 112 temporarily stores various types of data, which includes the image data acquired from the memory card 50, programs and the like. The ROM 113 stores in advance various types of data, various programs and the like for controlling the printing apparatus 100 in a non-volatile manner.

The operation panel 120 includes a liquid crystal display, a touch panel and the like, and receives instructions from a user. For example, the operation panel 120 displays an album (an image) to be printed, and receives an instruction for deciding whether to print the album from a user. Furthermore, the operation panel 120 can receive an instruction for selecting a layout frame from a user.

The print engine 130 prints the print data output from the controller 110 based on an instruction (a control signal) from the controller 110.

The interface 140 has a structure in which a portable memory (the memory card 50) such as a USB memory or a memory embedded in an electronic appliance including a digital camera and the like can be inserted into the printing apparatus 100. The interface 140 accesses the inserted memory card 50 to read the image data stored in the memory card 50 based on the instruction from the controller 110.

FIG. 2 is a diagram showing the functional configuration of the printing apparatus 100. As shown in FIG. 2, the printing apparatus 100 includes an operation reception unit 201, a display unit 202, a layout unit 203, a print processing unit 204, and a print execution unit 205.

The operation reception unit 201 receives various instructions from a user. For example, the operation reception unit 201 receives an instruction of print execution, an instruction for selecting one from a plurality of layout frames, and the like through the operation panel 120, and notifies the layout unit 203 of the received instructions.

The display unit 202 displays various images or messages on the operation panel 120. For example, the display unit 202 performs display of a candidate layout frame, display of a layout frame (an album) to which image data has been assigned, and the like based on an instruction from the layout unit 203.

The layout unit 203 performs a process (hereinafter, referred to as an "album creation process") for creating an album.

In detail, the layout unit 203 acquires the shooting date and time (data) of the image data stored in the memory card 50.

Furthermore, the layout unit 203 generates a histogram which represents the number of shots for each shooting time period based on the shooting date and time of the image data. In addition, the layout unit 203 gives a high weight for image data belonging to a shooting time period in which the number of shots is large.

Furthermore, the layout unit 203 decides a layout frame based on a value (hereinafter, also referred to as a "weight value W") weighted to the image data.

In addition, the layout unit 203 extracts the image data from the memory card 50 according to the weighted value. Herein, the number of the extracted image data is determined according to the selected layout frame.

Moreover, the layout unit 203 receives input of additional information to be printed together with the image data, and decides (edits) the color of the additional information based on the color of the extracted image data and other conditions.

Then, the layout unit 203 assigns the extracted image data and the additional information with the determined color to the layout frame according to predetermined rules.

In addition, the layout unit 203 stores the layout frame with the assigned image data in a recording medium (e.g., the RAM 112).

The print processing unit 204 reads the layout frame (the album) generated by the layout unit 203 from the recording medium (e.g., the RAM 112), and generates print data which can be printed by the print engine 130. Then, the print processing unit 204 transmits a print command for controlling the print engine 130 and the generated print data to the print engine 130, thereby allowing the print data to be printed.

The print execution unit 205 prints the print data output from the controller 110. In detail, when the print data and the print command are received, the print execution unit 205 controls the print engine 130 according to the received print command, thereby performing a printing process.

The printing apparatus 100 to which this embodiment is applied has the above-described configuration. However, the configuration of the printing apparatus 100 is not limited thereto. For example, the printing apparatus 100 may also include a multifunctional device further having a facsimile function and the like.

Furthermore, the above-described elements are classified according to main processing contents in order to facilitate the understanding of the configuration of the printing apparatus 100. The present invention is not limited by the classification method and titles of the elements. The configuration of the printing apparatus 100 can be classified into many more elements according to processing contents. In addition, one element can be classified so as to perform many more processing tasks. Moreover, processing of each element may also be performed through one piece of hardware, or a plurality of pieces of hardware.

Next, the characteristic operations of the printing apparatus 100 having the above configuration will be described. FIG. 3 is a flowchart explaining the album creation process performed by the printing apparatus 100 in accordance with this embodiment.

The layout unit 203 of the printing apparatus 100, for example, starts this flow at the timing at which the memory card 50 is inserted into the printing apparatus 100 (the interface 140), or at the timing at which software for executing the album creation process is started.

When this flow is started, the layout unit 203 acquires the attribute information (e.g., shooting date and time, setting information during shooting, and resolution) of the image data stored in the memory card 50 (step S101). In detail, the layout unit 203 accesses the memory card 50 through the interface 140, reads the attribute information of the entire image data, and stores the attribute information in the RAM 112.

Next, the layout unit 203 generates the histogram which represents the number of shots for each shooting time period based on the shooting date and time which has been acquired in step S101 (step S102).

Figure 4A:
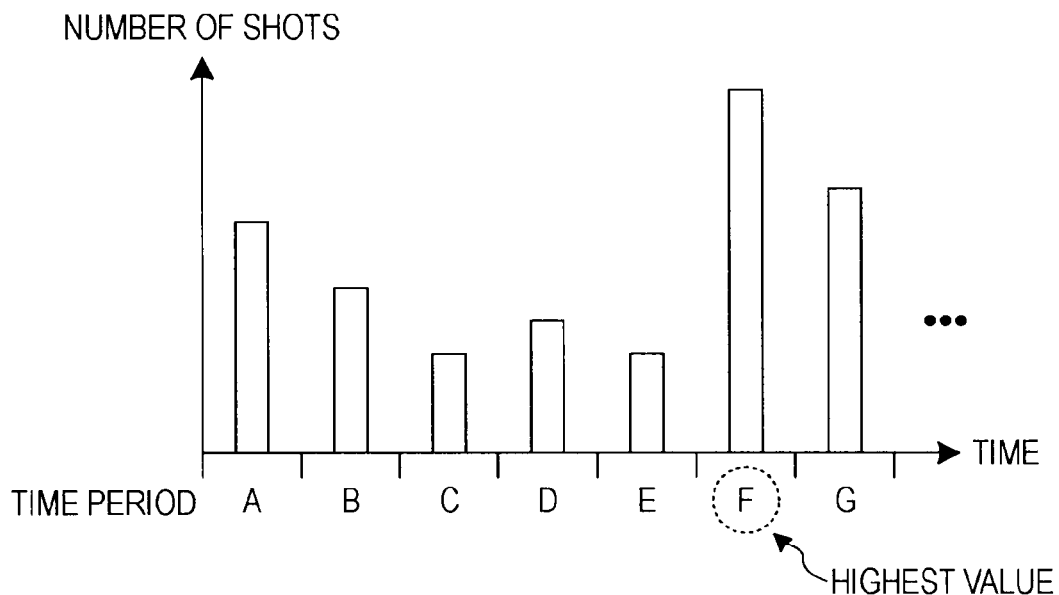
FIG. 4A is a diagram showing one example of a histogram representing the number of shots in each time period.

FIG. 4A is a diagram showing one example of the histogram generated by the layout unit 203.

In order to generate the histogram as shown in FIG. 4A, the layout unit 203 calculates the number of shots in shooting time periods F1 to F6 (e.g., in the unit of two hours). In detail, the layout unit 203 retrieves image data of the shooting dates and times belonging to predetermined shooting time periods A to G, and counts the number of shots in the shooting time periods A to G.

Then, the layout unit 203 gives a weight to the image data belonging to each shooting time period. As a method for giving the weight, for example, a value (a weight value W1), which is proportional to the number of shots in the shooting time periods to which each image data belongs, is weighted to each image data (the weight value W1=the number of shots in the shooting time period including the image data×a constant α). Referring to the example shown in FIG. 4A, a high weight value is given in the sequence (in which the number of shots is large) of the shooting time periods F, G, A, B, D and C·E.

Furthermore, when the number of items of image data is large (e.g., when the number of items of image data belonging to the shooting time period F, in which the number of shots is highest, is equal to or more than a predetermined value), the layout unit 203 may also calculate the number of shots in the shooting time periods F1 to F6 (e.g., in the unit of twenty minutes) which are further subdivided. In detail, the layout unit 203 retrieves image data of shooting dates and times belonging to the predetermined shooting time periods F1 to F6, and counts the number of shots in the shooting time periods F1 to F6.

Figure 4B:
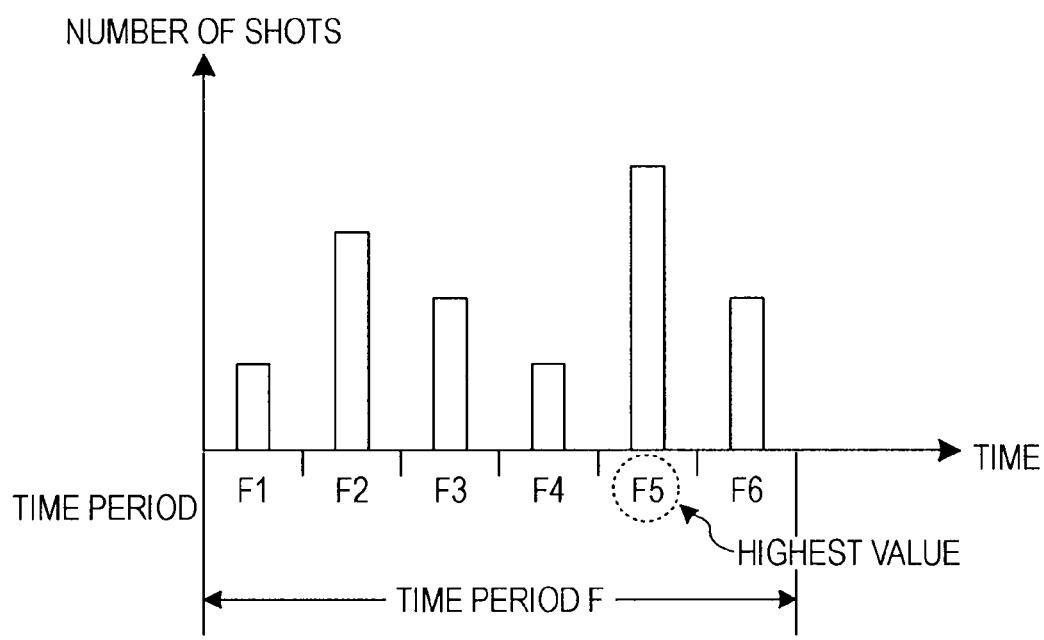
FIG. 4B is a diagram showing one example of a histogram representing the number of shots in each subdivided time period.

FIG. 4B is a diagram showing one example of a histogram when the shooting time period is subdivided. In the histogram shown in FIG. 4A, the layout unit 203 further subdivides the shooting time period (F in the example shown in FIG. 4A) in which the number of shots is highest, and further gives a weight to the image data belonging to the subdivided shooting time periods F1 to F6. As a method for giving the weight, for example, similarly to the above method, a value (a weight value W2), which is proportional to the number of shots in the shooting time period to which each image data belongs, is weighted to each image data (the weight value W2=the number of shots in the shooting time period including the image data×a constant β). Referring to the example shown in FIG. 4B, a high weight value is given in the sequence (in which the number of shots is large) of the shooting time periods F5, F2, F3·F6 and F1·F4.

Furthermore, the layout unit 203 may also generate a histogram which represents the number of shots in the shooting time periods based on the setting information during the shooting in addition to the shooting dates and times acquired in step S101.

In such a case, the layout unit 203, for example, calculates the number of shots in the shooting time periods F1 to F6 (e.g., in the unit of two hours) with respect to image data photographed under a specific setting. In detail, the layout unit 203 retrieves image data of a shooting date and time, which belongs to the predetermined shooting time periods A to G, from image data photographed under a scene setting (e.g., a setting for each scene such as a person, scenery or a night view), and counts the number of shots in the shooting time periods A to G. Furthermore, the layout unit 203 may retrieve image data of a shooting date and time, which belongs to the predetermined shooting time periods A to G, from image data photographed under a manual setting, and count the number of shots in the shooting time periods A to G.

Then, the layout unit 203 gives a weight to the image data belonging to each shooting time period. As a method for giving the weight, for example, a value (a weight value W3), which is proportional to the number of shots in the shooting time period to which each image data belongs, is weighted to each image data (the weight value W3=the number of shots in the shooting time period including the image data×a constant α).

In addition, instead of the weight value W1 (or the weight value W2) weighted using the histogram generated based on the shooting date and time, the layout unit 203 may also employ the weight value W3 weighted using the histogram generated based on the setting information during the shooting, or may also synthesize both the weightings (the weight values). In the case of synthesizing both the weightings, the layout unit 203 multiplies (W1×W3, W2×W3) the weight value W1 (or the weight value W2) weighted using the histogram generated based on the shooting date and time by the weight value W3 weighted using the histogram generated based on the setting information during the shooting for each image data, or adds (W1+W3, W2+W3) the weight value W1 (or the weight value W2) to the weight value W3 for each image data.

Moreover, the layout unit 203 may also generate a histogram which represents the number of shots in the shooting time periods based on the resolution in addition to the shooting dates and times acquired in step S101.

In such a case, the layout unit 203, for example, calculates the number of shots in the shooting time periods F1 to F6 (e.g., in the unit of two hours) with respect to image data with high resolution. In detail, the layout unit 203 retrieves image data of a shooting date and time, which belongs to the predetermined shooting time periods A to G, from image data with resolution having a predetermined value or more, and counts the number of shots in the shooting time periods A to G.

Then, the layout unit 203 gives a weight to the image data belonging to each shooting time period. As a method for giving the weight, for example, a value (a weight value W4), which is proportional to the number of shots in the shooting time period to which each image data belongs, is weighted to each image data (the weight value W4=the number of shots in the shooting time period including the image data×a constant α).

In addition, instead of the weight value W1 (or the weight value W2) weighted using the histogram generated based on the shooting date and time or the weight value W3 weighted using the histogram generated based on the setting information during the shooting, the layout unit 203 may also employ the weight value W4 weighted using the histogram generated based on the resolution, or may also combine and synthesize the weightings (the weight values). In the case of combining and synthesizing both the weightings, for example, the layout unit 203 multiplies (W1×W4, W2×W4) the weight value W1 (or the weight value W2) weighted using the histogram generated based on the shooting date and time by the weight value W4 weighted using the histogram generated based on the resolution for each image data, or adds (W1+W4, W2+W4) the weight value W1 (or the weight value W2) to the weight value W4 for each image data. Furthermore, the layout unit 203 may also multiply (W3×W4) the weight value W3 weighted using the histogram generated based on the setting information during the shooting by the weight value W4 weighted using the histogram generated based on the resolution for each image data, or may add (W3+W4) the weight value W3 to the weight value W4 for each image data. In addition, the layout unit 203 may also multiply (W1×W3×W4, W2×W3×W4) the weight value W1 (or the weight value W2) weighted using the histogram generated based on the shooting date and time by the weight value W3 weighted using the histogram generated based on the setting information during the shooting and the weight value W4 weighted using the histogram generated based on the resolution for each image data, or may add (W1+W3+W4, W2+W3+W4) the weight value W1 (or the weight value W2) to the weight value W3 and the weight value W4 for each image data.

Using the above weighting method, the layout unit 203 can acquire weight values W (weight values after the synthesis) for each image data. For example, the weight values W after the synthesis include W1, W2, W3, W4, W1×W3, W1×W4, W1+W3, W1+W4, W2×W3, W2×W4, W2+W3, W2+W4, W1×W3×W4, W2×W3×W4, W1+W3+W4, W2+W3+W4 and the like. In addition, a method for synthesizing the weight values is not limited to the above-described multiplication and addition. For example, it may be possible to synthesize the weight values by calculating an average value.

In addition, image data, which is photographed under a specific setting (e.g., a continuous shooting mode, an auto-bracket mode and the like) allowing a plurality of shots to be performed in a predetermined time through a one-time operation, may also be arranged as one group and treated as one image data.

For example, the layout unit 203 counts the number of shots as one with respect to the group of image data, generates a histogram for each shooting time period, and calculates a weight value W, which is proportional to the number of shots in the shooting time period, for each image data. In this way, during a time period in which the number of shots is large due to a continuous shooting mode and the like, large weighting can be prevented from being performed.

Furthermore, for example, after applying the weight value W to each image data, the layout unit 203 may also set any one of image data included in each group of the image data as a representative image, and set the weight value W applied to the representative image as a weight value W of the group. An average value of weight values W of the image data included in the group may also be set as a weight value W of the group. For example, among image data included in a group, image data with the fastest shooting time or the slowest shooting time, image data with the smallest weight value W or the largest weight value W, image data randomly selected and the like can be set as the representative image.

Then, the layout unit 203 decides a layout frame (step S103). In detail, the layout unit 203 specifies a shooting time period in which the number of shots is the largest by using the histogram generated in step S102. Then, the layout unit 203 decides the layout frame based on the number of shots (i.e., the highest value) of image data belonging to the specified shooting time period. For example, the layout unit 203 reads a layout frame, to which image data of the number (e.g., ½ of the highest value) of items smaller than the highest value can be assigned, from a predetermined recording medium (e.g., the RAM 112).

Then, the layout unit 203 extracts the image data assigned to the layout frame determined in step S103 from the memory card 50 (step S104). In detail, the layout unit 203 specifies the number of items of the image data assigned to the layout frame determined in step S103. Next, the layout unit 203 reads image data (corresponding to the specified number of items) from the memory card 50 according to the weight value (the weight value after the synthesis) W weighted in step S102, and stores the image data in the RAM 112. For example, the layout unit 203 randomly reads the image data by the sequence in which the weight values W weighted in step S102 is high, or the image data from the upper image data with the weight values W weighted in step S102.

In addition, the group of the image data as described above may also be treated as one piece of image data, and the image data may also be read from the memory card 50 according to the weight values W and stored in the RAM 112. In the case of reading the image data of the group, a representative image may be read.

Thereafter, the layout unit 203 assigns the image data extracted in step S104 to the layout frame determined in step S103 (in step S105). For example, the layout unit 203 synthesizes the layout frame with the image data according to the weight value (the weight value after the synthesis) W weighted to the image data. In addition, the layout unit 203 may also change the size or resolution of the extracted image data according to the layout frame determined in step S103.

Furthermore, the group of the image data as described above may also be treated as one piece of image data, and the layout frame may also be synthesized with the image data. In the case of synthesizing the layout frame with the image data of a group, the layout frame may be combined with a representative image.

FIG. 5 is a diagram explaining an operation in which image data is assigned to a layout frame.

Referring to the example shown in FIG. 5, for example, in the case in which image data including one large image and nine small images are assigned to the layout frame determined in step S103, the layout unit 203 assigns image data with the highest weight value W (to the largest frame) as the large image, and assigns image data with the $2^{nd}$ to $10^{th}$ weight values W as the small images. At this time, the layout unit 203 may also change the size or resolution of the image data such that the image data is fit into the layout frame.

Furthermore, the characteristics of image data to be assigned to each layout frame may also be designated in advance. For example, it may be designated in advance such that image data regarded as a head shot is assigned to a certain layout frame as a large image. In such a case, the layout unit 203 assigns image data of the head shot, which has the highest weight value W weighted thereto, as the large image in step S105.

Then, the layout unit 203 adds the above-described additional information (the title and the like of the album) (step S106). In detail, when the input of the additional information is received through the operation reception unit 201, the layout unit 203 decides the color (e.g., RGB) of the input additional information. As a method for deciding the color of the additional information, for example, the layout unit 203 determines a color with the highest appearance frequency of the image data assigned to the layout frame in step S105. Next, the layout unit 203 decides the determined color (or a similar color) as the color of the additional information. Then, the layout unit 203 assigns the additional information with the determined color to the layout frame determined in step S103 as an image with a size, which is fit into the layout frame.

Therefore, the layout unit 203 displays the layout frame (the album), to which the image data and the additional information have been assigned, on the operation panel 120 through the display unit 202 (step S107).

Figure 6A:
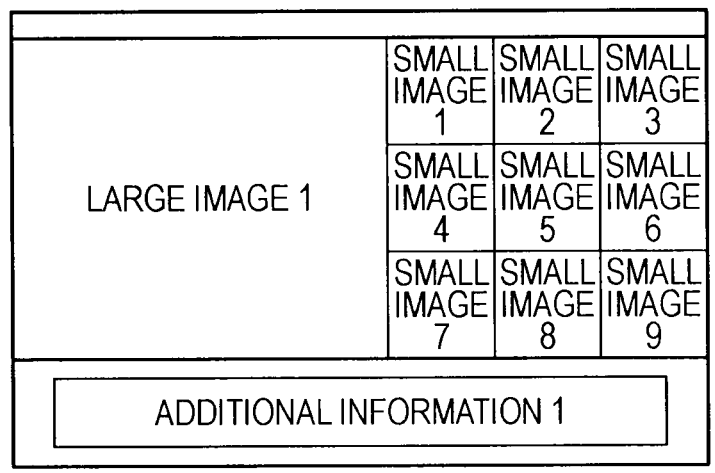
FIG. 6A is a diagram showing one example of a layout frame to which image data has been assigned.

FIG. 6A is a diagram showing one example of a layout frame (an album) to which image data has been assigned. For example, in step S107, the layout unit 203 displays the layout frame (the album) shown in FIG. 6A on the operation panel 120.

Herein, the layout unit 203 waits to receive an operation of print execution (OK) or an operation of print non-execution through the operation reception unit 201 (step S108).

When the operation of print non-execution is received in step S108 (No in step S108), the layout unit 203 returns to step S103. Thus, the layout unit 203 performs step S103 to step S107 again, thereby providing a user with a separate layout frame (an album).

Figure 6B:
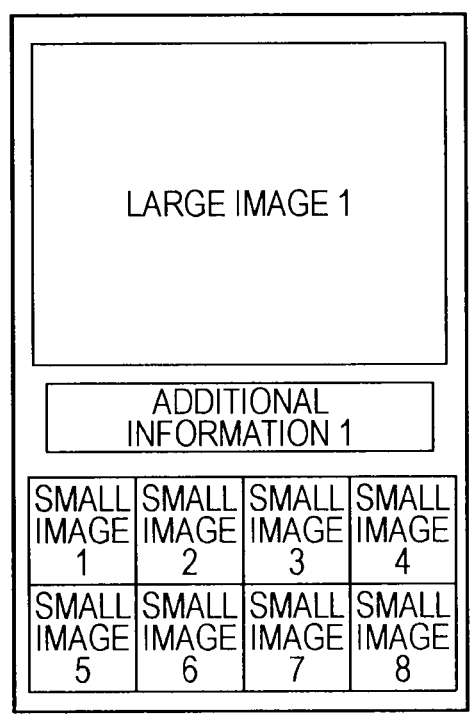
FIG. 6B is a diagram showing another example of a layout frame to which image data has been assigned.

FIG. 6B is a diagram showing another example of a layout frame (an album) to which image data has been assigned. For example, in the case of performing step S103 to step S107 again, the layout unit 203 displays the layout frame (the album) shown in FIG. 6B on the operation panel 120 in step S107.

Meanwhile, when the operation of print execution (OK) is received in step S108 (Yes in step S108), the layout unit 203 stores the layout frame (the album) in the RAM 112 and proceeds to step S109.

If step S109 proceeds, the print processing unit 204 prints the layout frame (the album) whose print execution has been instructed in step S108 (step S109). In detail, the print processing unit 204 reads the layout frame (the album) from the RAM 112 and generates print data which is printable by the print engine 130. Then, the print processing unit 204 transmits a print command for controlling the print engine 130 and the generated print data to the print engine 130, thereby allowing the print data to be printed.

At this time, the print execution unit 205 prints the print data output from the controller 110. In this way, an album desired by a user can be created.

If the printing operation is ended, the layout unit 203 ends this flow.

Since the album creating process is performed by the printing apparatus 100, it is possible to easily perform processes of selecting image data to be distributed from a large amount of image data, deciding the layout frame of the image data, and editing additional information suitable for the selected image data.

In addition, respective processing units of the above-described flow are divided according to the main processing contents in order to facilitate the understanding of the printing apparatus 100. The present invention is not limited by the classification method and titles of the processing steps. The processes performed by the printing apparatus 100 can be classified into many more processing steps. In addition, in one processing step, many more processing tasks may also be performed.

Furthermore, the present invention is not limited to the previous embodiment. For example, various modifications and applications can be made.

For example, according to the previous embodiment, in step S103, the layout unit 203 automatically decides the layout frame regardless of instructions from a user. However, the present invention is not limited thereto. For example, in step S103, the layout unit 203 displays a candidate of the layout frame through the display unit 202. Then, it may also be possible to receive an instruction for selecting one layout frame from a user through the operation reception unit 201, and decide the layout frame.

Furthermore, according to the previous embodiment, in step S106, the layout unit 203 decides the color (or the similar color) with the highest appearance frequency of the image data, which has been assigned to the layout frame, as the color of the additional information. However, the present invention is not limited thereto. For example, in step S106, the layout unit 203 may also decide a complementary color of the color with the highest appearance frequency of the image data, which has been assigned to the layout frame, as the color of the additional information. In addition, the layout unit 203 may also decide a color (e.g., a color with the highest appearance frequency of the image data assigned to the layout frame as a large image) of the most characteristic image data among the image data, which has been assigned to the layout frame, as the color of the additional information.

Moreover, it may also be possible to change a background color of the layout frame. For example, in step S106, the layout unit 203 changes (decides) the background color of the layout frame into a color (e.g., when the additional information is blue, light blue is employed as the background color) similar to that of the additional information. Furthermore, the layout unit 203 may also detect the ink remaining amount of an ink tank (not shown) with respect to each color, and use a color of the highest ink remaining amount as the background color.

Furthermore, the layout unit 203 may randomly generate and correct a color of the additional information and a background color of the layout frame based on the color of the additional information and the background color of the layout frame, which have been determined in step S106. Then, the layout unit 203 may display the generated layout frame (the image) on the operation panel 120, and decide a color of the additional information and a background color of the layout frame based on a user's instruction for selecting one layout frame.

Hereinafter, a second embodiment of the present invention will be described with reference to the accompanying drawings while focusing on the differences relative to that of the first embodiment.

The operation reception unit 201 receives an album editing operation for the layout frame (the album), which is displayed on the operation panel 120 and includes the image data and the additional information assigned thereto, and notifies the layout unit 203 of the reception of the editing operation. The editing operation, for example, includes an operation for replacing the displayed image data with other image data not being displayed, an operation for shifting (changing the position) the displayed image data, an operation for rotating the displayed image data, and the like. Of course, the editing operation is not limited thereto. For example, the editing operation may also include an operation for enlarging or reducing the displayed image data.

The display unit 202 displays the edited album based on the instructions from the layout unit 203 according to the editing operation. For example, the display unit 202 replaces the displayed image data with other image data not being displayed to display the replaced image data, shifts the displayed image data to display the shifted image data, and rotates the displayed image data to display the rotated image data based on the instructions from the layout unit 203.

The layout unit 203 performs a process (hereinafter, also referred to as an "album editing process") for editing the album. For example, the layout unit 203 receives various editing operations as described above through the operation reception unit 201, changes the configuration of the album according to the received editing operations, and instructs the display unit 202 to display the album changed by the editing operations.

In more detail, in the case of receiving the operation for replacing the displayed image data with other image data not being displayed, the layout unit 203 specifies image data, which will be displayed after replacing the displayed image data, by using a predetermined method, and replaces the displayed image data with the specified image data. The predetermined method, for example, includes a method for replacing the displayed image data with image data in the sequence of shooting time, a method for replacing the displayed image data with image data in the sequence of weight values W, a method for extracting image data satisfying predetermined conditions as replacement candidates and replacing the displayed image data with image data of the candidates in a predetermined sequence, and the like.

Furthermore, in the case of receiving the operation for shifting the displayed image data, the layout unit 203 replaces the displayed image data with the image data designated to be shifted and image data of a designated destination.

In addition, in the case of receiving the operation for rotating the displayed image data, the layout unit 203 rotates the image data designated to be rotated by a rotational amount.

Figure 7:
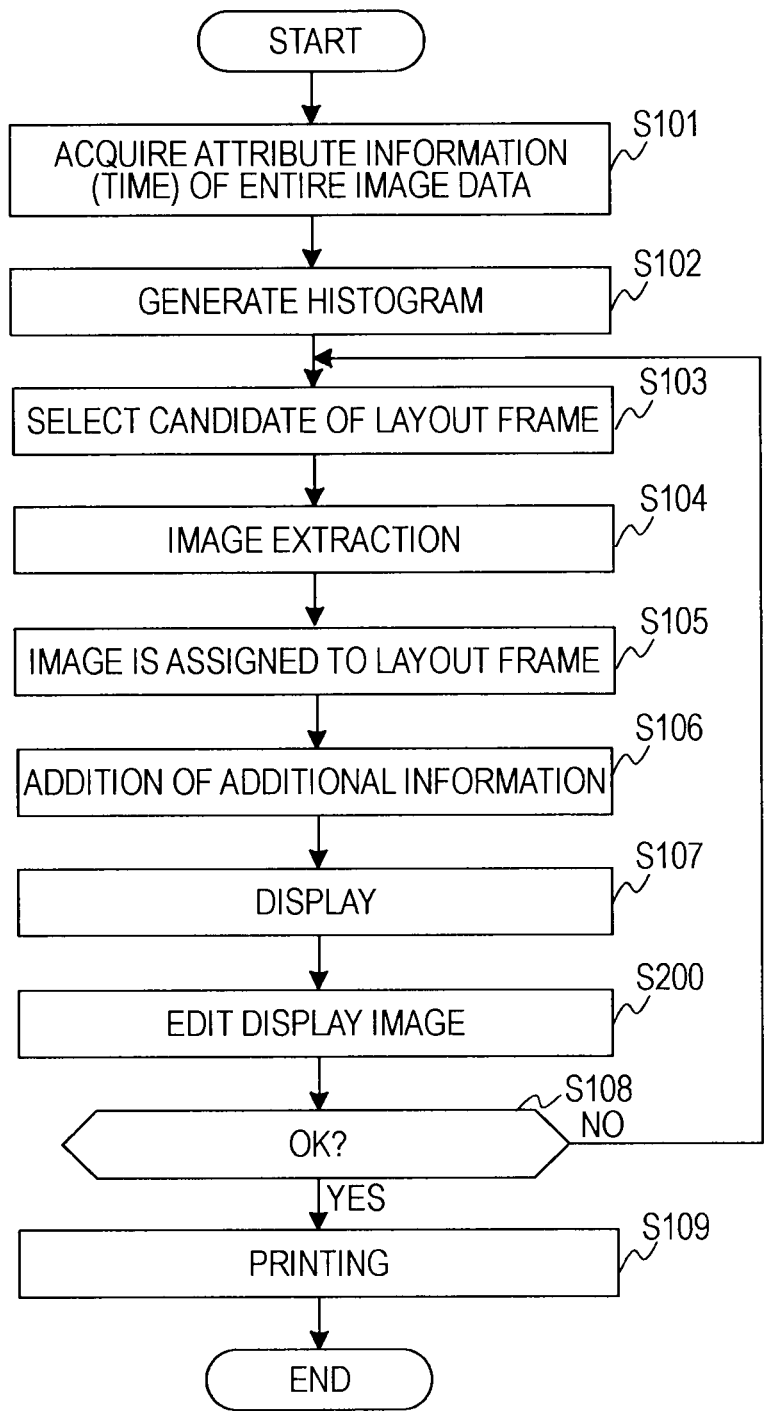
FIG. 7 is a flowchart explaining an album creation process and an album editing process in a printing apparatus in accordance with a second embodiment of the present invention.

Next, the characteristic operation of the printing apparatus 100 having the above configuration will be described. FIG. 7 is a flowchart explaining the album creation process and the album editing process performed by the printing apparatus 100 in accordance with the second embodiment.

Steps S101 to S107 and Steps S108 and S109 are the same as those of the first embodiment described with reference to FIG. 3.

If the layout frame (the album), to which the image data and the additional information have been assigned, is displayed on the operation panel 120 through the display unit 202 (step S107), the layout unit 203 receives the editing of the album through the operation reception unit 201 (step S200). Hereinafter, step S200 will be described in detail.

Figure 8:
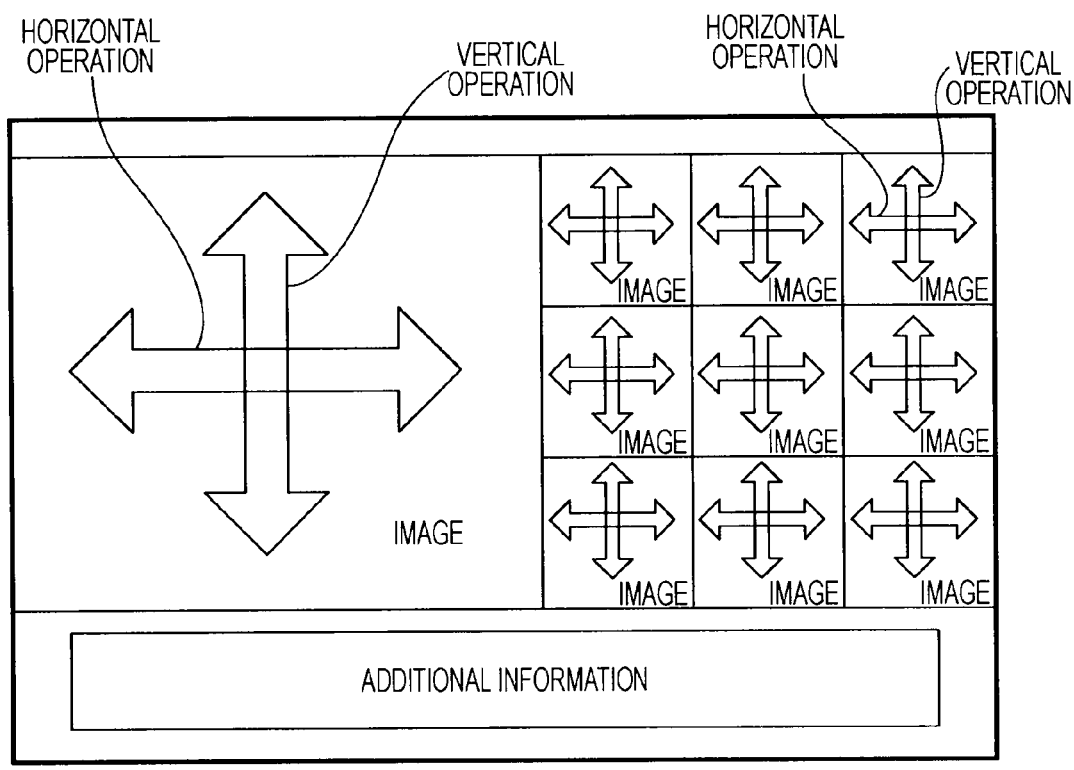
FIG. 8 is a diagram explaining one example of a replacement operation of image data in a layout frame to which image data has been assigned.

The layout unit 203, for example, receives an operation as shown in FIG. 8 through the operation reception unit 201. In the example of FIG. 8, operations (a scroll operation for sliding a finger in horizontal and vertical directions) in horizontal and vertical directions can be performed on the operation panel 120 with respect to respective frames.

In the case of receiving the operation in the vertical direction, the layout unit 203 replaces image data in the time sequence (ascending sequence or descending sequence) and displays the replaced image data (scrolling).

That is, the layout unit 203 specifies the image data displayed on the frame for which the operation has been performed. Furthermore, in the case of an operation in the upper direction, the layout unit 203 specifies image data with a shooting time slower than that of the displayed image data on the basis of the displayed image data. In the case of an operation in the lower direction, the layout unit 203 specifies image data with a shooting time faster than that of the displayed image data on the basis of the displayed image data. The image data specified as described above is displayed on the frame for which the operation in the vertical direction has been performed.

Figure 9:
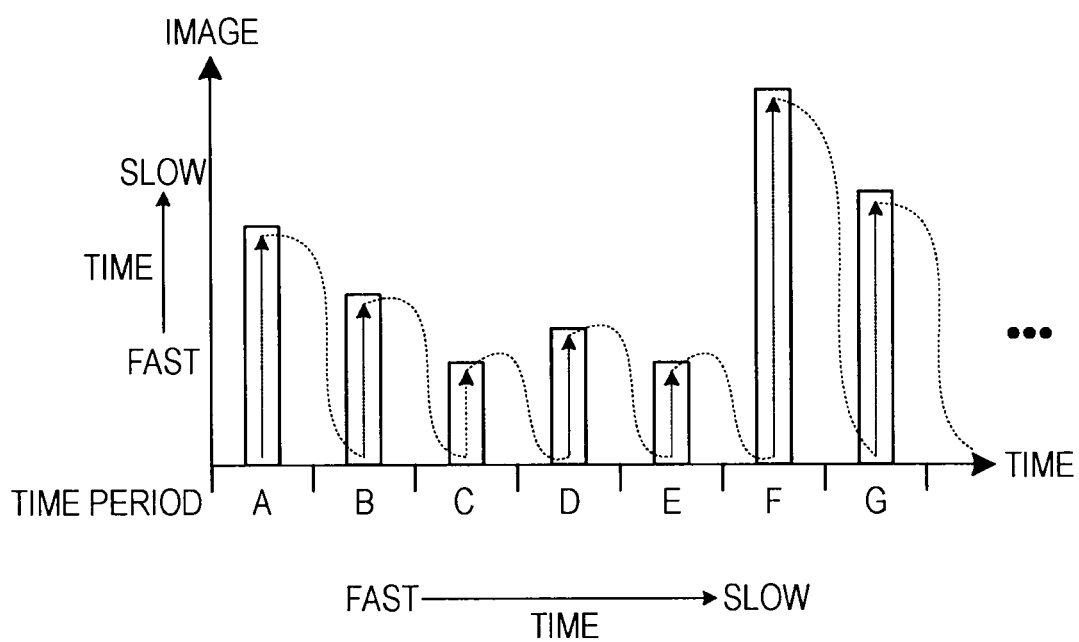
FIG. 9 is a diagram explaining one example of a replacement method of image data through a vertical operation.

For example, when a plurality of image data is arranged in an order of ascending shooting time as shown in FIG. 9, image data being displayed and serving as a reference is replaced with image data next to the arrow direction through the operation in the upper direction. Through the operation in the lower direction, image data being displayed and serving as a reference is replaced with image data next to the direction opposite to the arrow direction.

In the case of receiving the operation in the horizontal direction, the layout unit 203 extracts image data satisfying predetermined conditions as replacement candidates, replaces image data of the candidates in the time sequence (ascending sequence or descending sequence), and displays the replaced image data (scrolling).

That is, the layout unit 203 specifies in advance the image data satisfying the predetermined conditions as the replacement candidates. Furthermore, the layout unit 203 specifies the image data displayed on the frame for which the operation has been performed. In addition, in the case of an operation in the left direction, the layout unit 203 specifies image data with a shooting time slower than that of the displayed image data from the candidate image data on the basis of the displayed image data. In the case of an operation in the right direction, the layout unit 203 specifies image data with a shooting time faster than that of the displayed image data from the candidate image data on the basis of the displayed image data. The image data specified as described above is displayed on the frame for which the operation in the horizontal direction has been performed.

Figure 10:
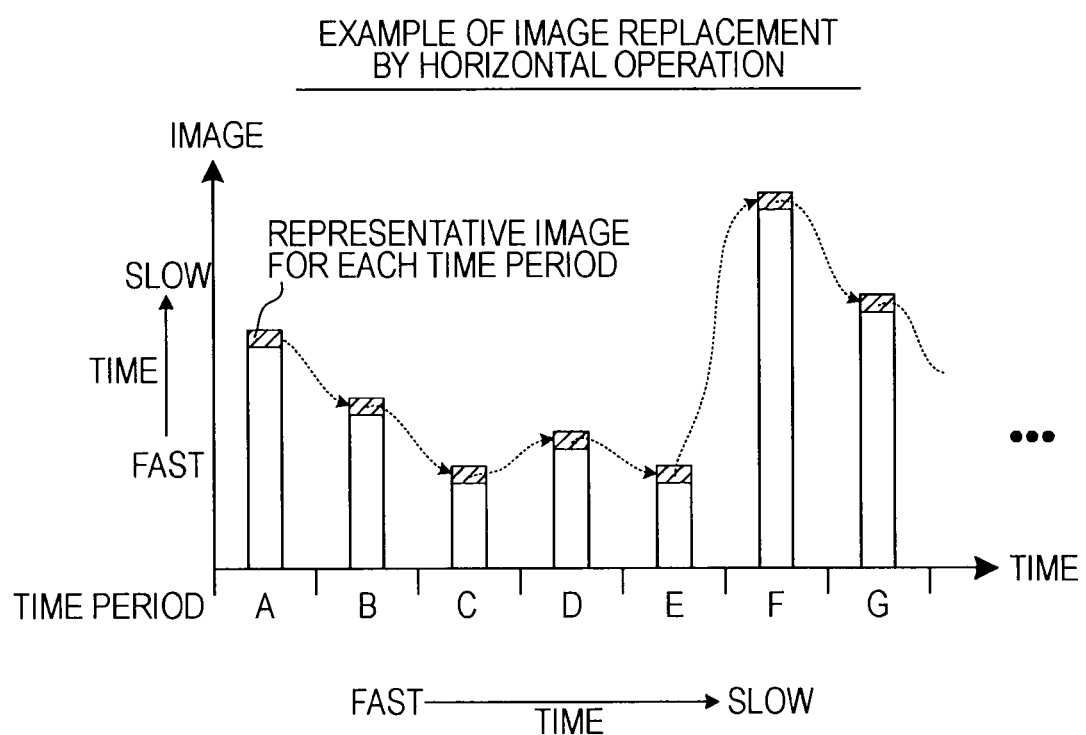
FIG. 10 is a diagram explaining one example of a replacement method of image data through a horizontal operation.

For example, when a plurality of image data is arranged in an order of ascending shooting time as shown in FIG. 10, the layout unit 203 specifies in advance representative images of each time period as candidates. In the example of FIG. 10, image data with the slowest shooting time in each time period is specified as a representative image. Through the operation in the left direction, image data being displayed and serving as a reference is replaced with representative image data next to the arrow direction. Through the operation in the right direction, image data being displayed and serving as a reference is replaced with representative image data next to the direction opposite to the arrow direction.

Figure 11:
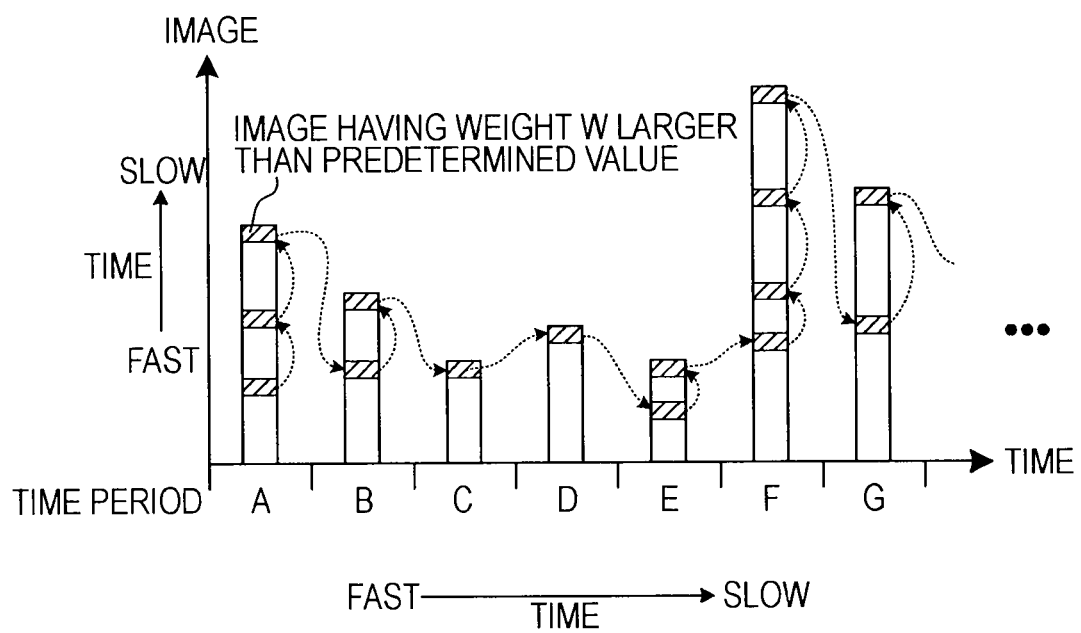
FIG. 11 is a diagram explaining one example of a replacement method of image data through a horizontal operation.

Furthermore, for example, when a plurality of image data is arranged in an order of ascending shooting time as shown in FIG. 11, the layout unit 203 specifies in advance image data with a weight value W larger than a predetermined value as candidates. Through the operation in the left direction, image data being displayed and serving as a reference is replaced with subsequent image data with a weight value W larger than the predetermined value in the arrow direction. Through the operation in the right direction, image data being displayed and serving as a reference is replaced with subsequent image data with a weight value W larger than the predetermined value in the direction opposite to the arrow direction.

In accordance with another example, image data arranged in time series may be grouped every predetermined number of pieces (e.g., 10), a representative image may be set in each group, and these representative images may be employed as replacement candidates at the time of the operation in the horizontal direction. Furthermore, for example, in relation to image data arranged in time series, the image data, which is photographed under a specific setting (e.g., a continuous shooting mode, an auto-bracket mode and the like) allowing a plurality of shots to be performed in a predetermined time through a one-time operation, may be arranged as one group, a representative image may be set in each group, and image data photographed in a normal mode and representative image data may be employed as replacement candidates at the time of the operation in the horizontal direction. In addition, for example, among image data included in a group, image data with the fastest shooting time or the slowest shooting time, image data with the smallest weight value W or the largest weight value W, image data randomly selected and the like can be set as the representative image.

Of course, in the case of receiving the operation in the horizontal direction, the layout unit 203 may replace image data in the sequence of the weight value W (ascending sequence or descending sequence) and display the replaced image data (scrolling).

That is, the layout unit 203 specifies the image data displayed on the frame for which the operation has been performed. In the case of the operation in the left direction, the layout unit 203 specifies image data with a weight value W smaller than that of the displayed image data on the basis of the displayed image data. In the case of an operation in the right direction, the layout unit 203 specifies image data with a weight value W larger than that of the displayed image data on the basis of the displayed image data. The image data specified as described above is displayed on the frame for which the operation in the horizontal direction has been performed.

Figure 12:
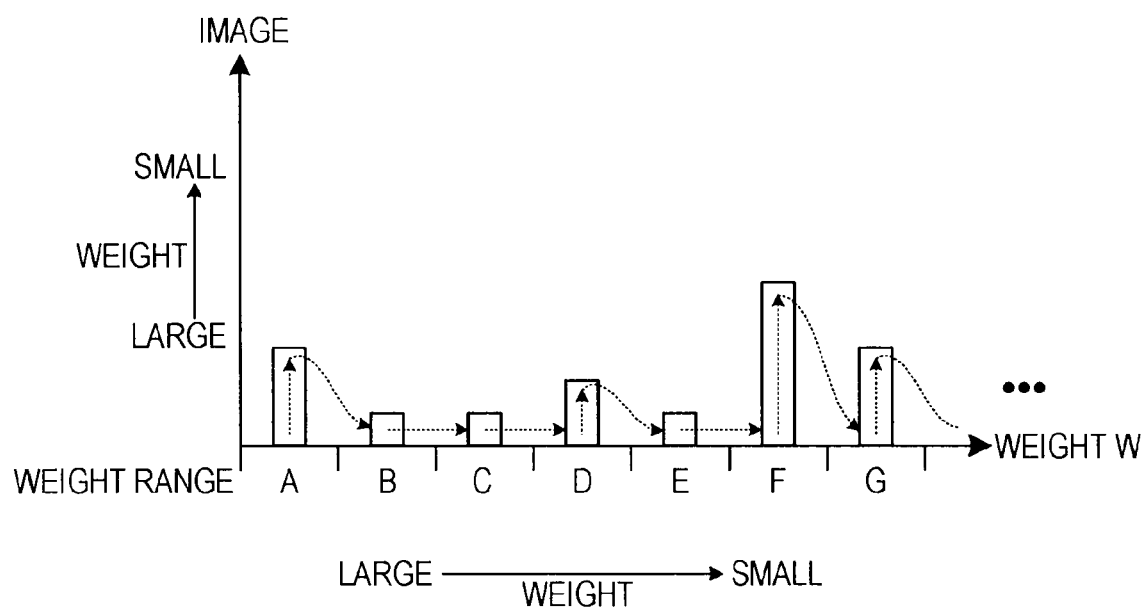
FIG. 12 is a diagram explaining one example of a replacement method of image data through a horizontal operation.

For example, when a plurality of image data is arranged in an ascending order of weight values W as shown in FIG. 12, image data being displayed and serving as a reference is replaced with image data next to the arrow direction through the operation in the left direction. Through the operation in the right direction, image data being displayed and serving as a reference is replaced with image data next to the direction opposite to the arrow direction.

In addition, in the previous embodiment, one piece of image data is replaced through a one-time scroll operation. However, the number of image data to be replaced may also be adjusted according to the speed of the scroll operation. For example, in the case of an operation in the vertical direction with a low speed, reference image data may be replaced with first (next) image data. In the case of the operation in the vertical direction with a medium speed, reference image data may be replaced with second image data. In the case of the operation in the vertical direction with a high speed, reference image data may be replaced with third image data. As for an operation in the horizontal direction, it is similar.

Moreover, the correspondence relation between the replacement method of the image data and the operation is not limited thereto. That is, it is possible to assign freely a certain replacement method to a certain operation. For example, it is possible to assign a replacement method of image data in the time sequence to the operation in the vertical direction, a replacement method of image data in the time sequence and in the unit of representative image data of a predetermined group to the operation in the horizontal direction, and a replacement method of image data in the sequence of weight values W to an operation in an inclination direction. Furthermore, for example, a user may also change a setting of the correspondence between the replacement method and the operation.

Figure 13:
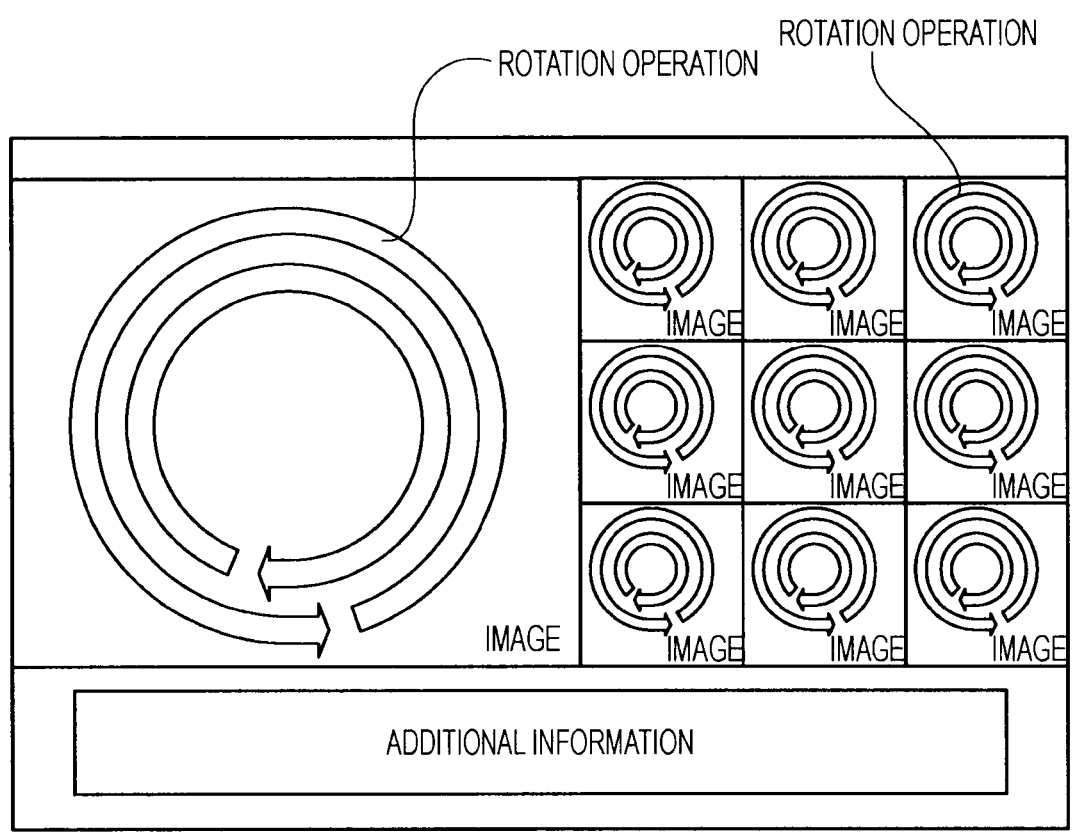
FIG. 13 is a diagram explaining one example of a rotation operation of image data in a layout frame to which image data has been assigned.

In addition, the layout unit 203, for example, receives an operation as shown in FIG. 13 through the operation reception unit 201. In the example of FIG. 13, a left rotation operation or a right rotation operation can be performed on the operation panel 120 with respect to respective frames.

In the case of receiving the left rotation operation, the layout unit 203 rotates displayed image data in the left direction and displays the rotated image data. In the case of receiving the right rotation operation, the layout unit 203 rotates displayed image data in the right direction and displays the rotated image data. The rotation, for example, can be performed in units of 90°. Furthermore, in the case of rotating image data, the reduced scale of the image data may also be changed according to the size of a frame. In addition, a rotation angle may also be adjusted according to a rotation speed. For example, in the case of a rotation operation with a low speed, image data may be rotated by an angle of 90°. In the case of a rotation operation with a medium speed, image data may be rotated by an angle of 180°. In the case of a rotation operation with a high speed, image data may be rotated by an angle of 270°.

Figure 14:
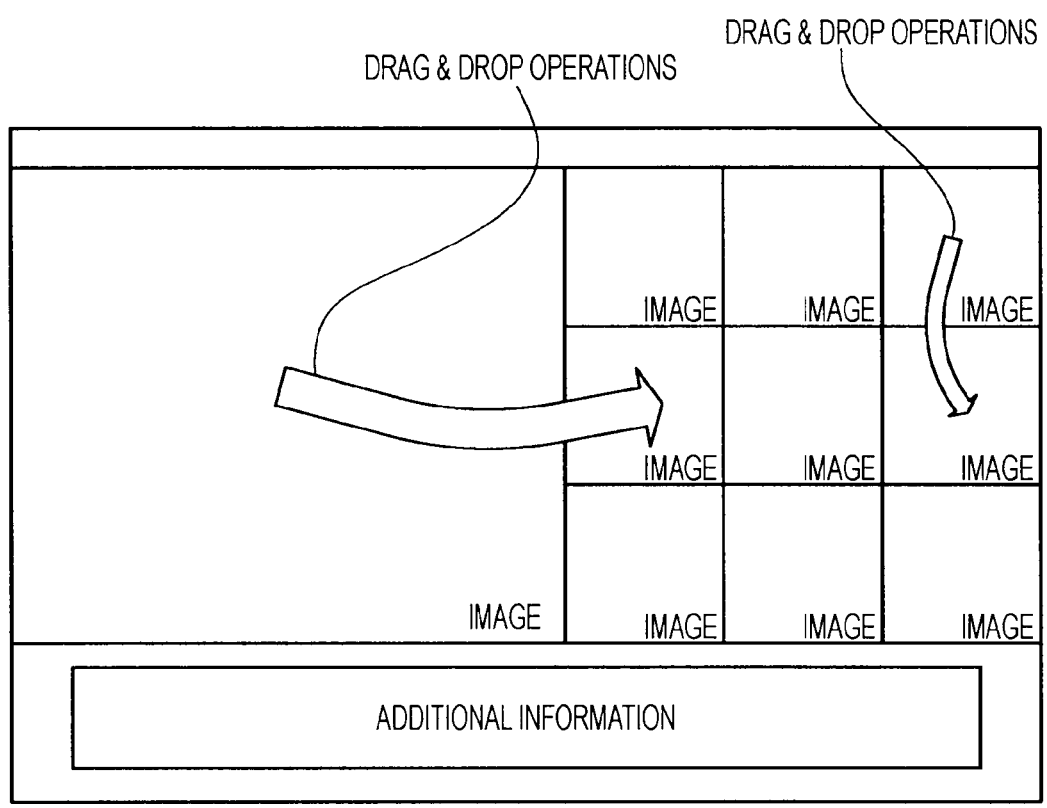
FIG. 14 is a diagram explaining one example of a shift operation of image data in a layout frame to which image data has been assigned.

In addition, the layout unit 203, for example, receives an operation as shown in FIG. 14 through the operation reception unit 201. In the example of FIG. 14, drag and drop operations can be performed on the operation panel 120 among respective frames.

In the case of receiving the drag operation, the layout unit 203 allows image data displayed in a frame for which the drag operation has been performed to be shifted outside the frame, and displays the image data. Furthermore, in the case of shifting the image data according to the drag operation and receiving the drop operation, the layout unit 203 allows image data displayed in a frame for which the drop operation has been performed to be shifted into the frame, for which the drag operation has been performed, to display the image data, and displays the dragged image data in the frame for which the drop operation has been performed. When the size of the frame is different before and after the shift, the image data may be enlarged or reduced.

In this way, the layout unit 203 edits the album and proceeds step S108.

In addition, in step S200, in the case of receiving the editing of the album, the layout unit 203 may also change the color of the additional information based on the image data displayed on the layout frame. Furthermore, in the case of receiving the editing of the album, the layout unit 203 may also receive a change of the additional information through the operation reception unit 201, and decide the color of the additional information.

The album creation process and the album editing process are performed by the printing apparatus 100, so that the same effect as that in the first embodiment can be achieved, and the layout of image data can be further easily edited. A user, for example, can perform a replacement to a temporally separate image having different characteristics through an operation in the horizontal direction, and can perform a replacement to an image having similar characteristics such as temporally close hue through an operation in the vertical direction.

What is claimed is:

1. A printing apparatus comprising:
   an image input unit that inputs image data;
   a first image narrowing unit that calculates the number of shots for each predetermined time period based on shooting date and time of image data, and gives a high weight for image data photographed during a time period in which the number of shots is large;
   a second image narrowing unit that calculates the number of shots for each predetermined time period based on shooting date and time of image data photographed under a specific setting, and gives a high weight for image data photographed during a time period in which the number of shots is large;
   a weight synthesis unit that synthesizes the weight given by the first image narrowing unit and the weight given by the second image narrowing unit;
   a layout decision unit that decides a layout of image data to be printed and additional information of the image data;
   an image data extraction unit that extracts image data in a descending order of weight from the image data input by the image input unit;
   an image assignment unit that assigns the image data extracted by the image data extraction unit to the layout determined by the layout decision unit;
   an image color determination unit that determines a color with a highest appearance frequency of the image data assigned to the layout; and
   an additional information adjustment unit that adjusts a color of the additional information according to the color determined by the image color determination unit, wherein the first image narrowing unit counts a group of a plurality of image data photographed at a predetermined time under a specific setting as one group including a number of shots, and calculates the number of shots for each predetermined time period based on the shooting date and time of the image data.

2. The printing apparatus according to claim 1, wherein the group of the plurality of image data photographed at the predetermined time under the specific setting includes a group of image data photographed under at least one setting of continuous shooting and auto-bracketing.

3. A printing apparatus comprising:
an image input unit that inputs image data;
a first image narrowing unit that calculates the number of shots for each predetermined time period based on shooting date and time of image data, and gives a high weight for image data photographed during a time period in which the number of shots is large;
a second image narrowing unit that calculates the number of shots for each predetermined time period based on shooting date and time of image data photographed under a specific setting, and gives a high weight for image data photographed during a time period in which the number of shots is large;
a weight synthesis unit that synthesizes the weight given by the first image narrowing unit and the weight given by the second image narrowing unit;
a layout decision unit that decides a layout of image data to be printed and additional information of the image data;
an image data extraction unit that extracts image data in a descending order of weight from the image data input by the image input unit;
an image assignment unit that assigns the image data extracted by the image data extraction unit to the layout determined by the layout decision unit;
an image color determination unit that determines a color with a highest appearance frequency of the image data assigned to the layout;
an additional information adjustment unit that adjusts a color of the additional information according to the color determined by the image color determination unit;
a display unit that displays the image data assigned to the layout and the additional information according to the layout;
an operation unit that receives an operation for replacing the displayed image data assigned to the layout with other image data; and
an image reassignment unit that replaces the image data assigned to the layout with other image data through the predetermined operation received in the operation unit based on at least one of shooting date and time and weight of the image data input by the image input unit.

4. The printing apparatus according to claim 3, wherein the image reassignment unit replaces the image data in a sequence of shooting date and time through a first operation received in the operation unit.

5. The printing apparatus according to claim 3, wherein the image reassignment unit sets one representative image data in a group of image data photographed during a predetermined time period, a group of image data photographed under a specific setting, or a group of a predetermined number of pieces of image data, and replaces the image data input by the image input unit with the representative image data in a sequence of shooting date and time through a second operation received in the operation unit.

6. The printing apparatus according to claim 3, wherein the image reassignment unit replaces the image data in a sequence of weight through a third operation received in the operation unit.

7. The printing apparatus according to claim 3, wherein, when the image data is replaced by the image reassignment unit, the image color determination unit determines the color with the highest appearance frequency of the image data reassigned to the layout, and the additional information adjustment unit adjusts the color of the additional information according to the color determined by the image color determination unit.

8. The printing apparatus according to claim 3, wherein the image data is replaced in each frame included in the layout.

9. A printing apparatus comprising:
an image input unit that inputs image data;
a first image narrowing unit that calculates the number of shots for each predetermined time period based on shooting date and time of image data, and gives a high weight for image data photographed during a time period in which the number of shots is large;
a second image narrowing unit that calculates the number of shots for each predetermined time period based on shooting date and time of image data photographed under a specific setting, and gives a high weight for image data photographed during a time period in which the number of shots is large;
a weight synthesis unit that synthesizes the weight given by the first image narrowing unit and the weight given by the second image narrowing unit;
a layout decision unit that decides a layout of image data to be printed and additional information of the image data;
an image data extraction unit that extracts image data in a descending order of weight from the image data input by the image input unit;
an image assignment unit that assigns the image data extracted by the image data extraction unit to the layout determined by the layout decision unit;
an image color determination unit that determines a color with a highest appearance frequency of the image data assigned to the layout; and
an additional information adjustment unit that adjusts a color of the additional information according to the color determined by the image color determination unit,
wherein the image assignment unit assigns image data with a highest weight value to a largest frame in the layout determined by the layout decision unit.

10. The printing apparatus according to claim 9, wherein the second image narrowing unit calculates the number of shots for each predetermined time period based on shooting date and time of image data photographed under a scene setting, and gives a high weight for image data photographed during a time period in which the number of shots is large.

11. The printing apparatus according to claim 9, wherein the second image narrowing unit calculates the number of shots for each predetermined time period based on shooting date and time of image data photographed under a manual setting, and gives a high weight for image data photographed during a time period in which the number of shots is large.

12. The printing apparatus according to claim 9, wherein the second image narrowing unit calculates the number of shots for each predetermined time period based on shooting date and time of image data photographed under a setting with high resolution, and gives a high weight for image data photographed during a time period in which the number of shots is large.

13. The printing apparatus according to claim 9, wherein the additional information adjustment unit employs a color similar to the color determined by the image color determination unit as the color of the additional information.

14. The printing apparatus according to claim 9, wherein the additional information adjustment unit employs a complementary color of the color determined by the image color determination unit as the color of the additional information.

15. The printing apparatus according to claim 9, wherein the layout decision unit decides the layout based on the number of shots of image data.

16. The printing apparatus according to claim 9, wherein the layout decision unit decides the layout based on a designation of a user.

17. The printing apparatus according to claim 9, wherein the layout decision unit designates in advance characteristics of image data to be assigned in each frame to which image data is assigned.

18. The printing apparatus according to claim 1, wherein the layout decision unit decides the layout based on the number of shots of image data.

19. The printing apparatus according to claim 1, wherein the layout decision unit decides the layout based on a designation of a user.

* * * * *